Patented Mar. 31, 1925.

1,531,541

UNITED STATES PATENT OFFICE.

ARTHUR HOWE CARPENTER, OF SAWPIT, COLORADO, ASSIGNOR TO THE COLORADO VANADIUM CORPORATION, OF NEW YORK, N. Y., A CORPORATION OF COLORADO.

METHOD OF TREATING VANADIUM ORES AND SOLUTIONS.

No Drawing.    Application filed June 9, 1920.    Serial No. 387,732.

*To all whom it may concern:*

Be it known that I, ARTHUR HOWE CARPENTER, a citizen of the United States of America, and residing in Sawpit, in the county of San Miguel and State of Colorado, have invented certain new and useful Improvements in Methods of Treating Vanadium Ores and Solutions, of which the following is a specification.

This invention relates to a method of treating ores of vanadium (especially the Roscoelite ores of southwestern Colorado) and of extracting soluble vanadium constituents from roasts, or the like, and aims to provide improvements therein.

The present invention provides a method whereby the extraction or solution of the vanadium compounds (previously rendered soluble if necessary or desirable by roasting and transposition of the insoluble vanadium compounds of the ore) is rendered more complete, resulting in a greater extraction from the gangue of its vanadium constituents, and resulting consequently in a greater recovery of the vanadium values. The method also provides a solution of the vanadium compounds of great purity.

Other features of improvement will be hereinafter set forth.

In carrying out the present invention a start is preferably made with the ore. The ores of vanadium usually contain the vanadium in an insoluble form, and it is hence preferable, or necessary, to transpose the vanadium compound to a soluble vanadium compound. In the treatment of such ores of vanadium as the Roscoelite ores of southwestern Colorado, a suitable quantity of a transposing agent, or agents, as for example, a mixture of sodium chloride and sodium carbonate are added to the crushed ore, and heated or roasted, in such manner as to effect the transposition, and also preferably in such manner as to effect the oxidation of the other constituents of the ore. Other materials may be added to the mass to be heated, as for example, sulphur or sulphur compounds, in accordance with present known practice.

The ore having been roasted, and the vanadium constituent transposed, or not, as the case may require, the mass is then treated to extract the compound, or compounds, of vanadium.

According to the present invention, there is employed a solution of a substance, such as sodium sulphate, containing positive ions adapted to form a soluble compound with the vanadium acid ion, and having a negative ion adapted to form an insoluble compound with a calcium ion.

The vanadium ores of southwestern Colorado contain greater or less quantities of calcium carbonate and when such ores are roasted, calcium oxide is formed, which calcium oxide forms calcium hydroxide with water. When the roast containing the soluble vanadate, as for example, sodium vanadate, is leached with water, the calcium hydroxide dissolves at the same time with the sodium vanadate. There is then immediately produced a re-action between the sodium vanadate and the calcium hydroxide (as well as the calcium oxide which remains in the ore) whereby the vanadium is precipitated as calcium vanadate and sodium hydroxide is formed. The sodium hydroxide formed renders the solution more alkaline, and thereby further promotes the re-action between the calcium compounds and the sodium vanadate. This calcium vanadate, being insoluble, remains in the tailings when the leaching is carried on in the ordinary way, and hence is a loss, or the tailings must be further treated, as for example, mixed with a transposing agent and heated, in order to be rendered soluble.

By leaching the mass with a solution of sodium sulphate, or other alkali metal sulphate, the sodium sulphate re-acts with calcium vanadate which is formed, whereby insoluble calcium sulphate and soluble sodium vanadate are formed.

In carrying out the present invention, however, the ore or roasted mass containing the vanadium to be dissolved is first preferably leached in the usual manner with water, or water slightly acidified with a mineral acid, and the liquid with the soluble vanadates which have dissolved therein, run off into a suitable receptable. Thereafter the mass is treated with a solution of sodium sulphate, which acts in the manner above described to form soluble sodium vanadate with the calcium vanadate in the mass, the calcium sulphate formed at the same time being precipitated. This solution containing the soluble vanadate may then be added to the previous solution obtained from leaching the ore or mass.

The leaching solution is preferably dilute, having a concentration of preferably about two per cent, and is also preferably hot.

Instead of the sodium sulphate above referred to, acid sodium sulphate may be used, the vanadate formed being acid sodium vanadate.

Preferably commercial "nitre cake" is used, this being principally sodium sulphate, containing some acid sulphate.

The sodium vanadate solution may thereafter be further treated, as for example, with an ordinary acid to precipitate the vanadic compound as vanadic acid or oxide ($V_2O_5$), the course of treatment depending upon the form in which it is desired to recover vanadium.

The inventive ideas herein set forth are capable of being practised otherwise than as specifically herein described.

What I claim is:

1. A method of extracting vanadium compounds from roasted ores of vanadium, or the like, containing calcium, comprising leaching the material containing a soluble vanadium compound contaminated with calcium vanadate with a dilute solution of a substance having a positive ion adapted to form a soluble compound with the vanadium acid ion, and having a negative ion adapted to form an insoluble compound with calcium ion.

2. A method of extracting vanadium compounds from roasted ores of vanadium, or the like, containing calcium, comprising leaching the material containing a soluble vanadium compound contaminated with calcium vanadate with a dilute solution of an alkali-metal sulphate.

3. A method of extracting vanadium compounds from roasted ores of vanadium, or the like, containing calcium, comprising leaching the material containing a soluble vanadium compound contaminated with calcium vanadate with a dilute solution of a sodium sulphate.

4. A method of extracting vanadium compounds from roasted ores of vanadium, or the like, containing calcium, comprising leaching the material containing a soluble vanadium compound contaminated with calcium vanadate with a dilute solution of sodium acid sulphate.

5. A method of extracting vanadium compounds from roasted ores of vanadium, or the like, containing calcium, comprising leaching the material containing a soluble vanadium compound contaminated with calcium vanadate with a dilute solution of commercial nitre-cake.

6. A method of treating ores of vanadium comprising roasting the ore with such additions of a transposing agent as may be necessary to transpose the vanadium compound to a soluble compound of vanadium, and leaching the material containing the vanadium compound with a solution of a substance having a positive ion adapted to form a soluble compound with the vanadium acid ion, and having a negative ion adapted to form an insoluble compound with a calcium ion.

7. A method of treating ores of vanadium comprising roasting the ore with such additions of a transposing agent as may be necessary to transpose the vanadium compound to a soluble compound of vanadium, and leaching the material containing the vanadium compound with a solution of an alkali-metal sulphate.

8. A method of treating ores of vanadium comprising roasting the ore with such additions of a transposing agent as may be necessary to transpose the vanadium compound to a soluble compound of vanadium, and leaching the material containing the vanadium compound with a solution of a sodium sulphate.

9. A method of treating ores of vanadium comprising roasting the ore with such additions of a transposing agent as may be necessary to transpose the vanadium compound to a soluble compound of vanadium, and leaching the material containing the vanadium compound with a solution of sodium acid sulphate.

10. A method of treating ores of vanadium comprising roasting the ore with such additions of a transposing agent as may be necessary to transpose the vanadium compound to a soluble compound of vanadium, and leaching the material containing the vanadium compound with a solution of commercial nitre-cake.

In witness whereof, I have hereunto signed my name.

ARTHUR HOWE CARPENTER.